March 21, 1944.　　　O. A. BAILEY　　　2,344,499
LIFTER ROOF
Filed Nov. 14, 1941
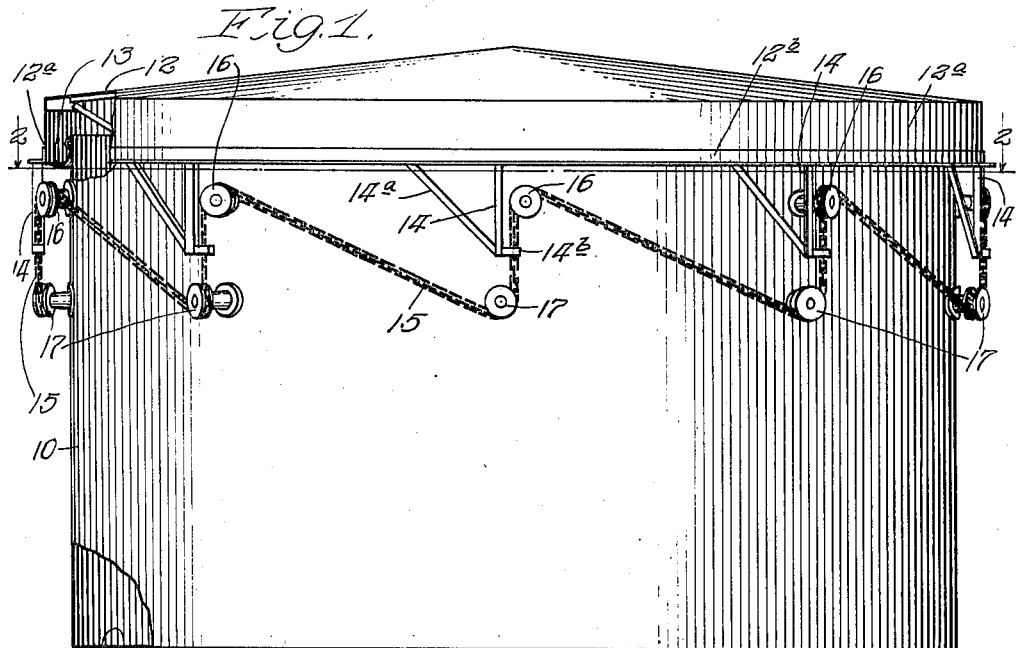
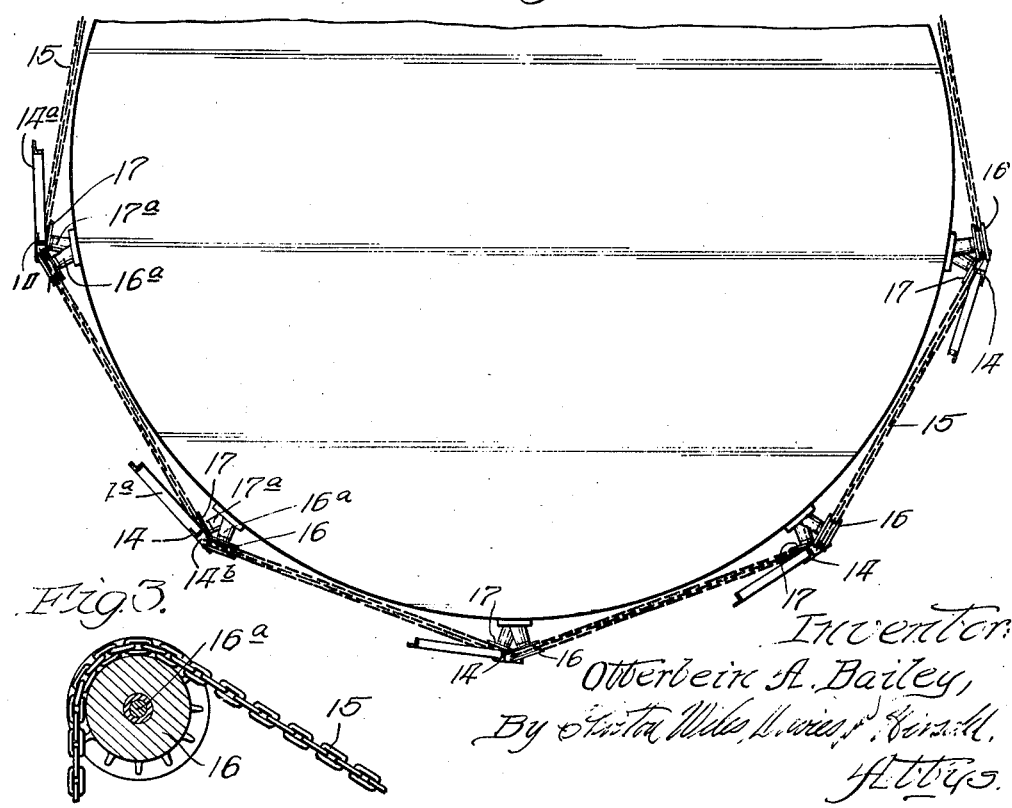

Patented Mar. 21, 1944

2,344,499

UNITED STATES PATENT OFFICE 2,344,499

LIFTER ROOF

Otterbein A. Bailey, Chicago, Ill., assignor to Chicago Bridge & Iron Company, a corporation of Illinois Application November 14, 1941, Serial No. 419,185

1 Claim. (Cl. 48—176)

This invention relates to improvements in lifter roofs and more especially such a device in connection with a tank, shell or container adapted for the storage of gases, or volatile liquids.

Among the features of my invention is the provision of means for stabilizing the roof or preventing it from tipping or tilting as it rises and falls.

My improved stabilizing means is simple and efficient in construction and operation.

Other features and advantages of my invention will appear more fully as I proceed with my specification.

In that form of device embodying the features of my invention shown in the accompanying drawing, Fig. 1 is a view in side elevation, Fig. 2 is a view taken as indicated by the line 2, 2 of Fig. 1, and Fig. 3 is an enlarged detailed view of one of the idler wheels.

As shown in the drawing, the tank comprises the cylindrical shell 10 with the bottom 11.

12 indicates a vertically movable roof connected to the shell 10 by the flexible fabric seal 13 which maintains a substantially gas-tight closure for the tank during the upward and downward movements of the roof, it being understood that the roof floats on the gas in the tank, moving upwardly and downwardly in accordance with changes in pressure. A tank of the type shown is especially adapted to the storage of gases and volatile liquids.

The periphery of the roof is provided with a depending flange 12a to the lower edge of which the flexible seal 13 is attached on the inside. On the outside edge of this flange there is a stiffening angle 12b carrying the depending arms 14 with their diagonal braces 14a. These arms are substantially equally spaced about the tank. As here shown there are ten of the same.

Extending entirely around the tank is an endless chain 15 lying over the upper idler wheels 16 and under the lower idler wheels 17. The idler wheels 16 and 17 are arranged in pairs around the tank, an upper wheel 16 lying substantially above a lower wheel 17 so that there will be a substantially straight vertical run of chain between the two wheels of each pair. See Fig. 1.

The lower ends of the arms 14 are fastened by means of the clamps 14b to the chain between the wheels 16 and 17 of each pair.

It will be seen that when one arm rises, its connection by the chain 15 with the next adjacent arm to the left will cause that arm to rise in unison with it and thus entirely around the tank. In a similar manner, all arms must descend in unison. Accordingly, the roof 12 is prevented from tipping or tilting as it rises and falls.

The wheels 16 and 17 are mounted on the shell of the tank 10 by suitable stub axles 16a and 17a, respectively.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as permissible, in view of the prior art.

What I claim as new, and desire to secure by Letters Patent, is:

A storage tank, comprising: a substantially cylindrical shell; a vertically movable roof having a relatively short distance of travel; a flexible seal between the shell and the roof; an endless flexible member extending entirely around the shell carried on pulleys mounted on the shell, said pulleys being arranged in pairs, the two pulleys of each pair being in substantially vertical alignment, said flexible member extending over the upper pulley of each pair and under the lower pulley of each pair; and a plurality of members on the roof attached to said flexible member between the two pulleys of each pair, whereby said members must move in unison as the roof rises and falls.

OTTERBEIN A. BAILEY.